US006922756B2

(12) United States Patent
Hum et al.

(10) Patent No.: US 6,922,756 B2
(45) Date of Patent: Jul. 26, 2005

(54) FORWARD STATE FOR USE IN CACHE COHERENCY IN A MULTIPROCESSOR SYSTEM

(75) Inventors: Herbert H. J. Hum, Portland, OR (US); James R. Goodman, Madison, WI (US)

(73) Assignee: Intel Corporation, Santa Clara, CA (US)

( * ) Notice: Subject to any disclaimer, the term of this patent is extended or adjusted under 35 U.S.C. 154(b) by 345 days.

(21) Appl. No.: 10/325,069

(22) Filed: Dec. 19, 2002

(65) Prior Publication Data

US 2004/0123046 A1 Jun. 24, 2004

(51) Int. Cl.[7] .............................................. G06F 12/00
(52) U.S. Cl. ...................... 711/145; 711/141; 711/142; 711/143; 711/144; 711/146
(58) Field of Search ................................ 711/141–146

(56) References Cited

U.S. PATENT DOCUMENTS

| | | | | |
|---|---|---|---|---|
| 5,297,269 A | * | 3/1994 | Donaldson et al. | 711/145 |
| 5,557,767 A | * | 9/1996 | Sukegawa | 711/113 |
| 6,189,043 B1 | * | 2/2001 | Buyukkoc et al. | 709/241 |
| 6,263,409 B1 | * | 7/2001 | Haupt et al. | 711/154 |
| 6,275,905 B1 | | 8/2001 | Keller et al. | |
| 6,478,498 B1 | * | 11/2002 | Miyasaka et al. | 401/215 |
| 6,728,841 B2 | * | 4/2004 | Keller | 711/146 |
| 6,795,900 B1 | * | 9/2004 | Miller et al. | 711/145 |
| 2002/0087809 A1 | | 7/2002 | Arimilli et al. | |

OTHER PUBLICATIONS

Jim Handy, "The Cache Memory Book," Second Edition, 1998, pp. vii–229, Academic Press Limited, London, United Kingdom.

"IEEE Standard for Scalable Coherent Interface (SCI)," IEEE Std 1596–1992, 1992, pp. i–243, Institute of Electrical and Electronics Engineers, Inc., USA.

"UltraSPARC User's Manual, UltraSPARC-1, UltraS-PARC-II," Jul. 1997, pp. iii–394, Sun Microsystems, USA.

* cited by examiner

Primary Examiner—T Nguyen
(74) Attorney, Agent, or Firm—Blakely, Sokoloff, Taylor & Zafman LLP

(57) ABSTRACT

Described herein is a cache coherency protocol having five states: Modified, Exclusive, Shared, Invalid and Forward (MESIF). The MESIF cache coherency protocol includes a Forward (F) state that designates a single copy of data from which further copies can be made. A cache line in the F state is used to respond to request for a copy of the cache line. In one embodiment, the newly created copy is placed in the F state and the cache line previously in the F state is put in the Shared (S) state, or the Invalid (I) state. Thus, if the cache line is shared, one shared copy is in the F state and the remaining copies of the cache line are in the S state.

34 Claims, 10 Drawing Sheets

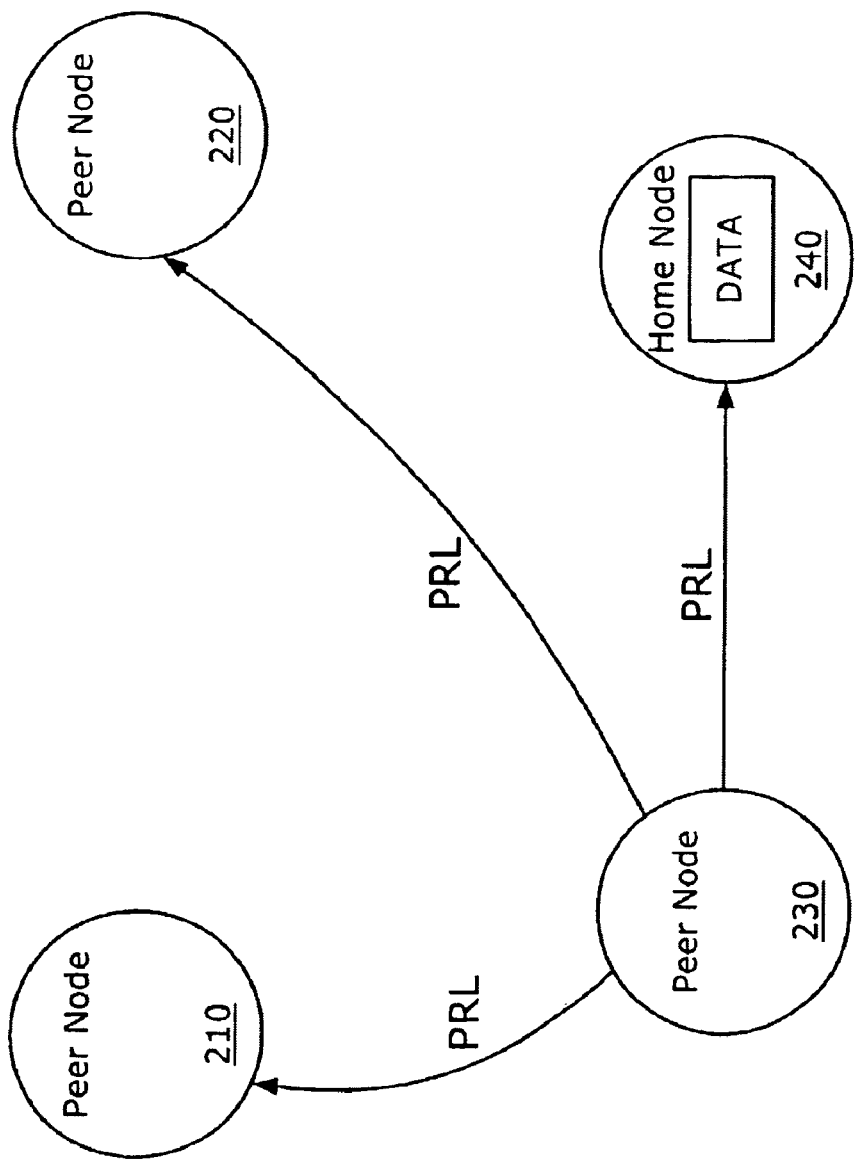

FORWARD STATE FOR USE IN CACHE COHERENCY IN A MULTIPROCESSOR SYSTEM

RELATED APPLICATIONS

The present U.S. Patent application is related to the following U.S. Patent applications filed concurrently:

(1) application Ser. No. 10/325,427, filed Dec. 19, 2002, entitled "SPECULATIVE DISTRIBUTED CONFLICT RESOLUTION FOR A CACHE COHERENCY PROTOCOL."

(2) application Ser. No. 10/326,232, filed Dec. 19, 2002, entitled "HIERARCHICAL DIRECTORIES FOR CACHE COHERENCY IN A MULTIPROCESSOR SYSTEM"

(3) application Ser. No. 10/324,711, filed Dec. 19, 2002, entitled "HIERARCHICAL VIRTUAL MODEL OF A CACHE HIERARCHY IN A MULTIPROCESSOR SYSTEM"

(4) application Ser. No. 10/326,232, filed Dec. 19, 2002, entitled "NON-SPECULATIVE DISTRIBUTED CONFLICT RESOLUTION FOR A CACHE COHERENCY PROTOCOL"

FIELD

The invention relates to cache memories. More particularly, the invention relates to a Forward (F) state for use in a cache coherency protocol in a multiprocessor system.

BACKGROUND

Most cache coherency protocols have a shared state in which data can be shared between any number of system components (e.g., processors). The shared (S) state arises when a system component requests a read-only copy of the data and the data was already in an Exclusive (E) state in another system component. The requesting system component and the system component that had a copy of the data each mark the data in shared state. When data is in the shared state, that data can be freely copied by the system components requesting a read-only copy of the data.

In bus-based multiprocessor systems, cache coherency protocols generally do not permit a system component to provide the shared data to a requesting system component. Instead, the data is retrieved from the memory system directly. In directory-based cache coherency protocols, the memory system also provides a shared copy to the requesting system component. The directory of cache line states (and thus, data states) is located between the system components and memory, thus the data is retrieved from memory and sent to the requesting system component.

The shared state can present numerous issues in a multiprocessor system that uses a point-to-point interconnection network between the system components especially when it does not rely upon a directory for tracking cache line states. To limit the issues in such systems, prior art solutions suggest that requests from a system component are routed directly to the memory system and then the memory system is responsible for broadcasting the request to determine the data (cache line) state, collecting the responses from the other system components and then determining what state the data should be when the request is fulfilled. These protocols result in four hops for the data to be returned: 1) requestor to memory, 2) memory broadcast request to other system components, 3) system components respond to the memory system, and 4) the memory system forwarding the data to the requester.

To lower the latency associated with fulfilling request in a fully connected point-to-point system, the requesting system component can broadcast its request to all other system components as well as to the memory system. If another system component has the data in shared state, then it could directly deliver the data to the requestor. Complexities arise when multiple system components simultaneously request the same data and multiple other system components have the data in shared state. The requestor system component must deal with potentially multiple data returns. More issues arise when one or more system components request the right to modify a shared data.

When one of the system components wants to modify the data, that component must issue a "request-for-ownership" (RFO) asking permission from the rest of the system to modify the requested data. After RFO is granted, the state of the data is changed from shared to another state (e.g., modified) that indicates that the data has been modified.

To illustrate, FIGS. 1a and 1b are conceptual diagrams of a four node system having a prior art cache coherency protocol. In the example of FIG. 1b, dashed lines represent messages previously sent and solid lines represent messages being described. In this system, only the four traditional cache line states are used: modified (M), exclusive (E), shared (S), and invalid (I). This is known as the MESI cache coherency protocol. Nodes 110, 120 and 130 are peer nodes that store a copy of the requested data (e.g., a cache line) in cache memory. Home node 140 stores the original copy of the data in memory or modified versions of the data when the modifications are written back to memory. That is, home node 140 is responsible for the non-cached copy of the data. In the example of FIG. 1a, nodes 120 and 130 both have copies of the requested data stored in cache memory and the data is in a shared (S) state.

When peer node 110 issues an RFO requesting the right to modify the data, peer node 110 broadcasts an RFO to the other nodes of the system. As illustrated in FIG. 1b, nodes 120 and 130 both respond to the request from peer node 110 by providing a copy of the requested data. Because both nodes 120 and 130 are capable of providing copies of requested data, peer node 110 must be capable of receiving and reconciling multiple copies of requested data. This adds complexity to the design of peer node 110. As the number of nodes in a system increases, this requirement further increases in complexity, which increases the cost and difficulty of system design.

More complex situations can also exist where multiple requesting nodes can each receive a copy of the requested data, for example, from three or more nodes. Thus, each node must be capable of resolving the multiple conflicting copies of requested data in order to ensure proper system functionality.

BRIEF DESCRIPTION OF THE DRAWINGS

The invention is illustrated by way of example, and not by way of limitation, in the figures of the accompanying drawings in which like reference numerals refer to similar elements.

FIGS. 2a and 2b are conceptual illustrations of transfer of data from its home node to a requesting node using the Forward state.

DETAILED DESCRIPTION

Figure 1A:
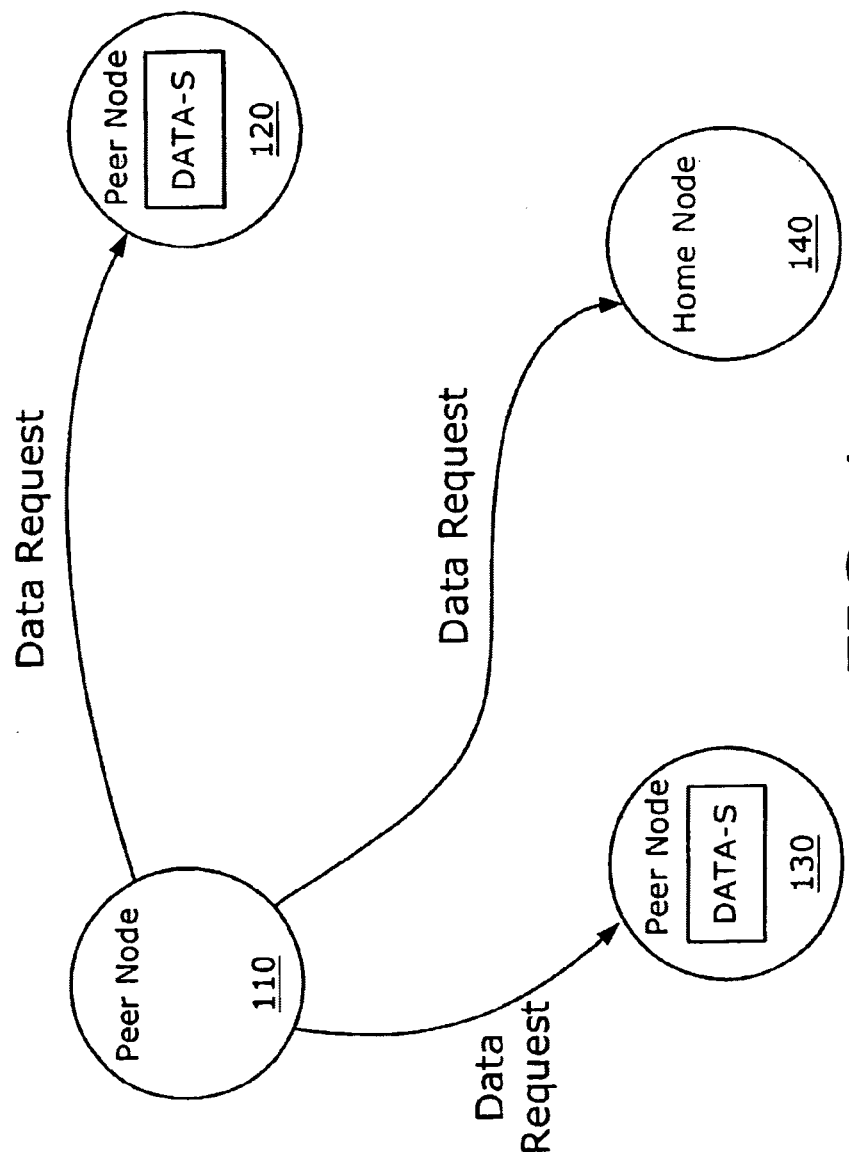
FIGS. 1a and 1b are conceptual illustrations of a four node system having a prior art cache coherency protocol.
Figure 1B:
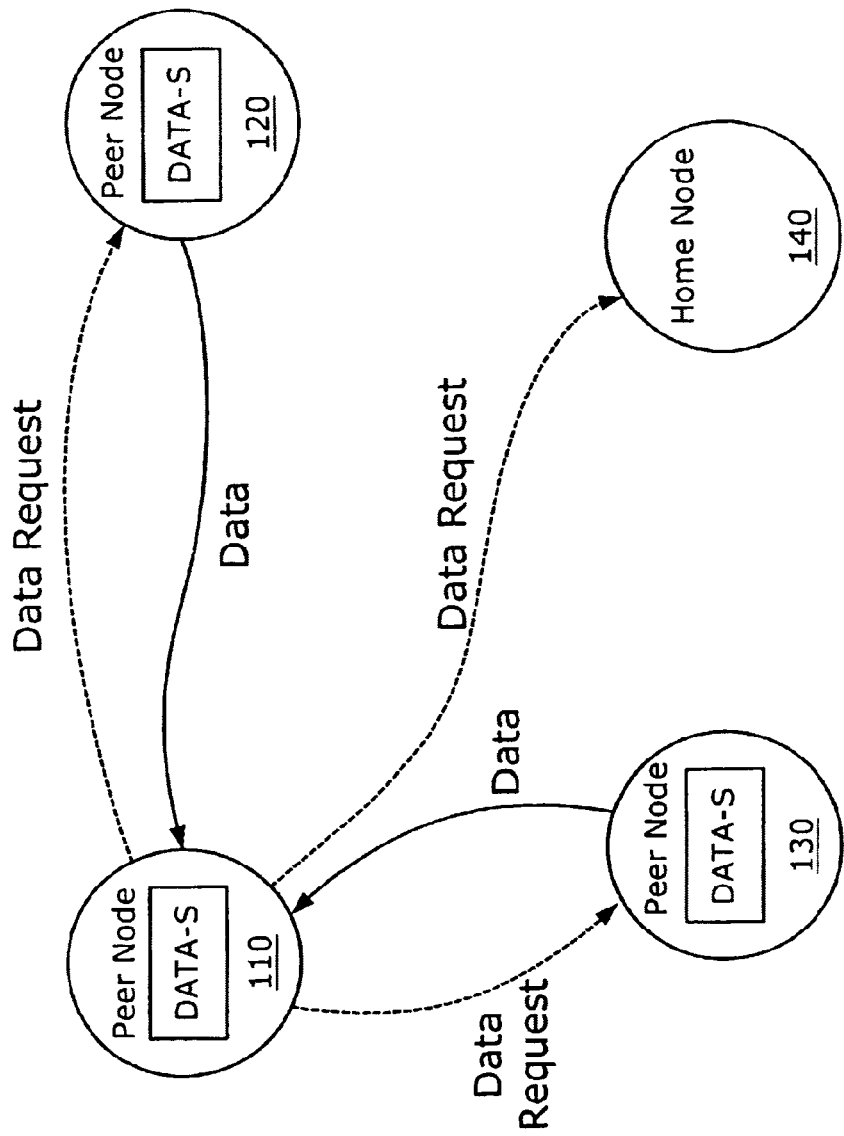

Use of a Forward (F) state for cache coherency in a multi-node system is described. The F state permits a shared data to be transmitted from the current owning system component to the requesting system component without concern of multiple data copies received at the requesting system component, be it a read-only request or a read-for-ownership request.

The F state is different from the O state in a prior art cache coherency protocol known as MOESI (Modified, Owner, Exclusive, Shared, and Invalid) in that the system component having data in the O state has the only updated data value in the system. Moreover, it is inconsistent from the copy in the memory system. This necessitates the system component, upon eviction of an owned data, to send that data back to be stored in the memory system. The F state indicates that the data value is consistent with the copy in the memory system. If a system component evicts data in the F state the component can simply remove the data without storing the data back to the memory system.

In the following description, for purposes of explanation, numerous specific details are set forth in order to provide a thorough understanding of the invention. It will be apparent, however, to one skilled in the art that the invention can be practiced without some of these specific details. In other instances, structures and devices are shown in block diagram form in order to avoid obscuring the invention.

In the description that follows, a cache coherency protocol is described that includes five states (Modified, Exclusive, Shared, Invalid, Forward), and is also referred to as the MESIF protocol. In alternate embodiments, the Forward state can be used with other than and/or in addition to the MESI states. In other words, five states, one of which is a forward state, is not necessary.

In order to provide the cache coherency protocol several cache coherency protocol message types are described. As a preliminary matter, a summary of messages used for cache coherency is provided below. Not all of the messages described are required to provide a coherency protocol having an F state, but the group of messages can be used to provide a cache coherency protocol having an F state.

Request Messages

The following messages are requests for data/action from a requesting node (system component). These messages are broadcast to all nodes of the system.

Port Read Line (PRL): This is a request for a copy of a data segment such as, for example, a cache line.

Port Read Invalidate Line (PRIL): This is a request for a copy of a data segment where the provider node's copy of the data is invalidated. This is a "request-for-ownership" (RFO) type message.

Port Write Line (PWL): This message causes data (e.g., a modified cache line) to be written to memory. This message can also be referred to as a "dirty eviction."

Response Messages

The following messages are messages sent from Peer (i.e., Non-Home) nodes to the Requesting node in response to requests described above. The Home node is the node containing the memory system corresponding to the requested cache line.

Invalid State Acknowledgement (IACK): This message is a response to a request (PRL, PRIL, PWL) when the node sending the response has an invalid copy of the requested data or no copy of the requested data.

Shared State Acknowledgement (SACK): This message is a response to a request when the node sending the response has, and retains, a copy of the requested data in the Shared state.

Acknowledgement of Data Received (DACK): This message acknowledges the receipt of requested data.

Conflict: This message indicates that there is a copending request for the requested cache line.

Messages to Home Node

These messages are transmitted to the Home node by a Peer node.

Read(Conflicts): This message requests data from the Home nodes and lists all conflicts, if any.

CNCL(Conflicts): This message is sent to the Home node in response to a hit in a Peer node and lists all conflicts, if any. This message cancels the Home node's prefetch operation.

Messages from the Home Node

These messages are sent from the Home node to the Peer and/or Requesting nodes.

Data: This message includes the requested data and can indicate the state of the data (M/E/F/S) to be used by the Requesting node.

Acknowledge (ACK): This message indicates that the requested data has been sent to the Requesting node.

Wait: This message causes the receiving node to wait for incoming data before sending further messages.

Transfer (XFR): This message causes the receiving node to transfer data to the node indicated in the message.

Overview of the MESIF Cache Coherency Protocol

Described herein is a cache coherency protocol having five states: Modified, Exclusive, Shared, Invalid and Forward (MESIF). The MESIF cache coherency protocol includes a Forward (F) state that designates a single copy of data from which further copies can be made. A cache line in the F state is used to respond to a request for a copy of the cache line. In one embodiment, the newly created copy is placed in the F state and the cache line previously in the F state in another system component (non-Home node) is put in the Shared (S) state, or the Invalid (I) state. Thus, if the cache line is shared, one shared copy in one system component is in the F state and the remaining copies of the cache line in the other system components are in the S state.

The MESIF protocol described herein is new because it essentially a snooping protocol without the limitations of a single, serializing bus. Like a snooping cache protocol, MESIF relies on nodes with cached copies of data to maintain coherence. The use of point-to-point links rather than a synchronous, centralized broadcast introduces the problem of time-warp—the fact that events appear to occur in a different order from the viewpoint of different node. The MESIF protocol correctly handles time-warp, recognizing when potential errors could result and making sure that they are handled correctly. The notion of a Home node is primarily to determine where the uncached copy reside, but the Home node can participate in every transaction—without being on the critical path—in order to resolve conflicts and time-warp issues. Because of the concurrent-broadcast nature of the scheme, MESIF achieves the low latency associated with snooping protocols, acquiring a cacheable copy of the data in most cases in the minimum possible latency: a single roundtrip request-response.

Ignoring for the time-warp problem, it is possible to achieve the two-hop accesses when there is a unique cached copy in the system. The introduction of the F-state extends this capability to the common case where multiple copies exist. Essentially, the F-state establishes a "first-among-equals" that determines which node should respond when multiple nodes could.

The MESIF protocol involves broadcasting an initial request to all peer nodes as well as the Home node. If a copy is cached in state E, F, or M, it is included in the response. A second message is then sent to the Home node, informing it that the request has been satisfied. If the requested line is uncached, or if only S-state copies exist, the second request sent to the Home node is used to confirm the previous request, which the Home node may have by now fetched from its memory. In either case, the Home node must respond to the second request (and to the first, though they can sometimes be combined) for purposes of synchronization and conflict resolution. Note that the Home node may have one or more caches, so it may respond to the initial request just like any other node.

Complications arise from allowing a node to use the data as soon as the data arrives rather than waiting for all responses. Thus, a node receiving a copy of the data is allowed to use the data internally immediately upon receipt, but may not make the effects of using the data visible to the rest of the system until the node has received a confirmation from Home. The confirmation may also include instructions that the node must forward its copy to another node, and perhaps evict the node from its own cache.

When a node responds to a request from another node by supplying the cached data, the node defers all other requests it receives for the same cache line until the node receives a response from the Home node acknowledging the fact that the node forwarded the data, thus assuring that all nodes observe the same order of transfer of the (possibly writable) cache line.

The Home node is the respository for the uncached data, but the home node also may have a processor generating requests and include one or more caches. Like any other node, when the home nodes processor misses, the home node must broadcast requests to all other (peer) nodes, and the home node must handle the request internally as it would any other request arriving for the Home node. Note that this is a special case in that the home node does not explicitly send messages to itself (the Home node). In addition, when an external request arrives for data that is cached locally, the Home node must respond in a way to assure that a later response from the Home node is not ambiguous. That is, the home node may respond to the initial request by supplying the data, but the home node must also respond to the second request as the Home node.

Variants of the protocol allow the Home node to respond with the uncached copy of the data without knowing whether this data is valid, leaving it to the requesting node and the second response from the Home node to sort out the case where data was supplied inappropriately.

Overview of the Forward State

In one embodiment, the Forward state is used in a system where requests are broadcast asynchronously, which means that the responses cannot be observed by all nodes in the system and the node having data stored in the F state cannot have a unique copy because a valid copy is stored in memory (e.g., by the home node). Thus, unlike the Owned state of the MOESI protocol, in which the data in the O state is the only valid copy of the data, the data in the F state can be dropped or converted to the S state, if desired.

The F state can be described as a "first among equals" notion in the context where there exists a valid copy of requested data in memory. Prior protocols (e.g., MOESI and SCI) do not provide this situation. The MOESI protocol maintains an owned copy because a valid copy is not maintained in memory. The owned copy may be eliminated only by updating the copy in memory. The SCI protocol is not a broadcast protocol because requests are sent to a directory node to be processed.

Figure 2B:
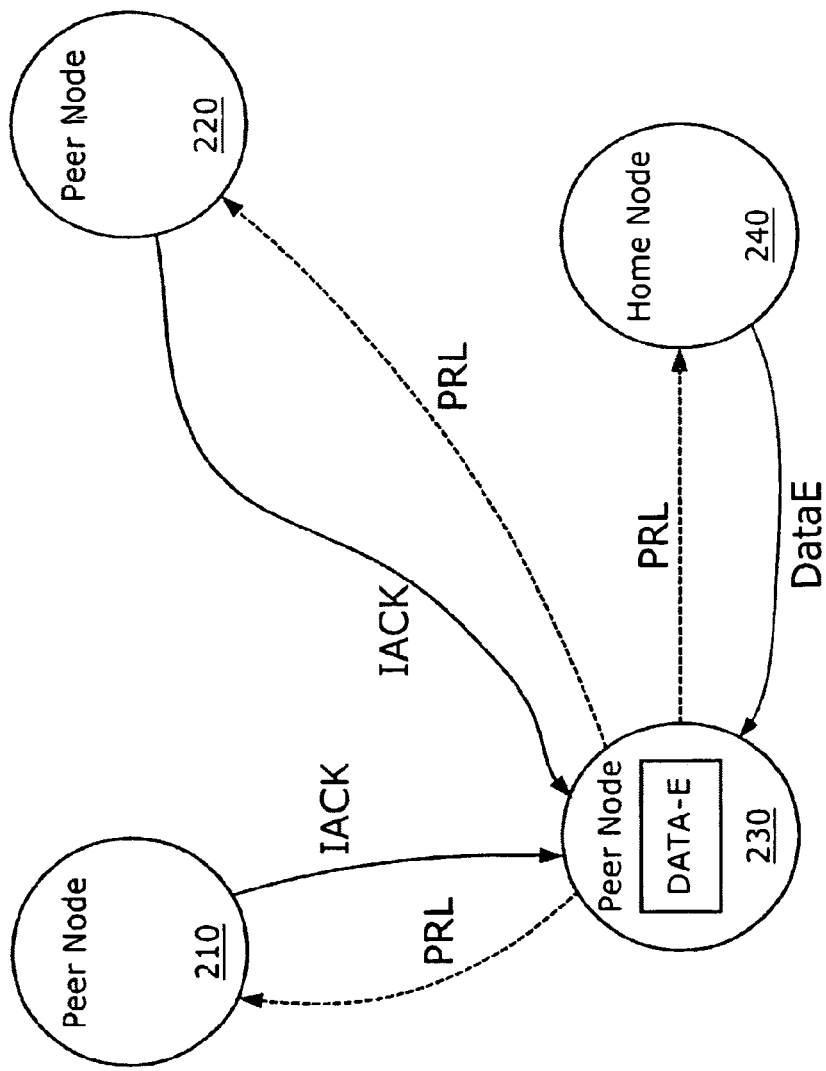

FIGS. 2a and 2b are conceptual illustrations of transfer of data from its home node to each of two peer nodes using the Forward state. In the example of FIGS. 2a and 2b as well as FIGS. 3a through 3c, dashed lines represent messages previously sent and solid lines represent messages being described. In order to keep the figures more clear, when a set of messages (e.g., PRIL and corresponding LACK) are resolved, the lines representing the messages are no longer included in the figures.

The discussion that follows is provided in terms of nodes within a multi-node system. In one embodiment, a non-Home node includes a processor having an internal cache memory and/or an external cache memory. In an alternate embodiment, a non-Home node is an electronic system (e.g., computer system, mobile device) interconnected with other electronic systems. In yet another embodiment, each and all nodes can be a processor having an internal cache memory and an adjoining memory system. In the last embodiment described above, a node can act as a home node to a request when the data requested is homed in the memory system of the node.

FIG. 2a illustrates a multi-node system in which a requested set of data (e.g., a cache line) is stored by home node 240 only. This situation may occur, for example, the first time a set of data is accessed. The data is stored in memory associated with home node 240 and is not stored in the cache memory associated with any of nodes 210, 220 and 230. Peer node 230 requests the block of data by broadcasting a PRL message to all nodes of the system. Peer node 230 can request the block of data using other types of messages, for example, PRIL messages.

FIG. 2b illustrates the multi-node system of FIG. 2a in response to the request for data by peer node 230. Nodes 210 and 220 send IACK messages to peer node 230 indicating that the cache memories of nodes 210 and 220 do not contain a valid copy of the requested data. Home node 240 sends the requested data to peer node 230 in a DataE message. The DataE message indicates to peer node 230 that the requested data should be stored at peer node 230 in the E state.

When another peer node, for example, peer node 220, makes a subsequent request to the same cache line, peer node 230 provides the cache line directly to peer node 220 by responding to a PRL request from peer node 220 with a DataF message (rather than the DataE message as provided by home node 240). Peer node 230 transitions its copy of the cache line to shared state (S). Furthermore, peer node 220, upon receiving a response from peer node 210 along with the DataF message from peer node 230, sends a CNCL( ) message to home node 240. Home node 240 then sends an ACK message to peer node 220, thus permitting peer node 220 to keep the cache line in F state. Peer node 220 can then respond to subsequent requests to the same cache line with DataF.

In one embodiment, the copy of the data in the F state, is the copy used for providing additional copies to subsequently requesting nodes. Thus, the data in the F state is used to respond to future requests for a copy of the data. The newly created copy of the data is placed in the F state and the copy of the data previously in the F state is put in the S state. In other words, if the data is shared, one shared copy is in the F state and the remaining copies of the data, if any, are in the S state. Alternatively, the source of the copy of the requested data is maintained in the F state and the new copy is stored in the S state.

The single copy of the data in the F state provides at least two advantages. First, cache-to-cache responses are typically faster than memory-to-cache responses. Thus, having a single designated, cached copy of the data that is used to provide copies to requesting nodes can increase the overall performance of a multi-node system.

Second, the F state simplifies the transition of data from the S state to the Modified (M) state. Because only one copy of the data in the F state exists, this allows a single point for resolving conflicting requests and reduces the transition to one of invalidating all other copies. Using the copy in the F state for providing redundant copies makes it simpler to prohibit proliferation of copies during this period.

Figure 3A:
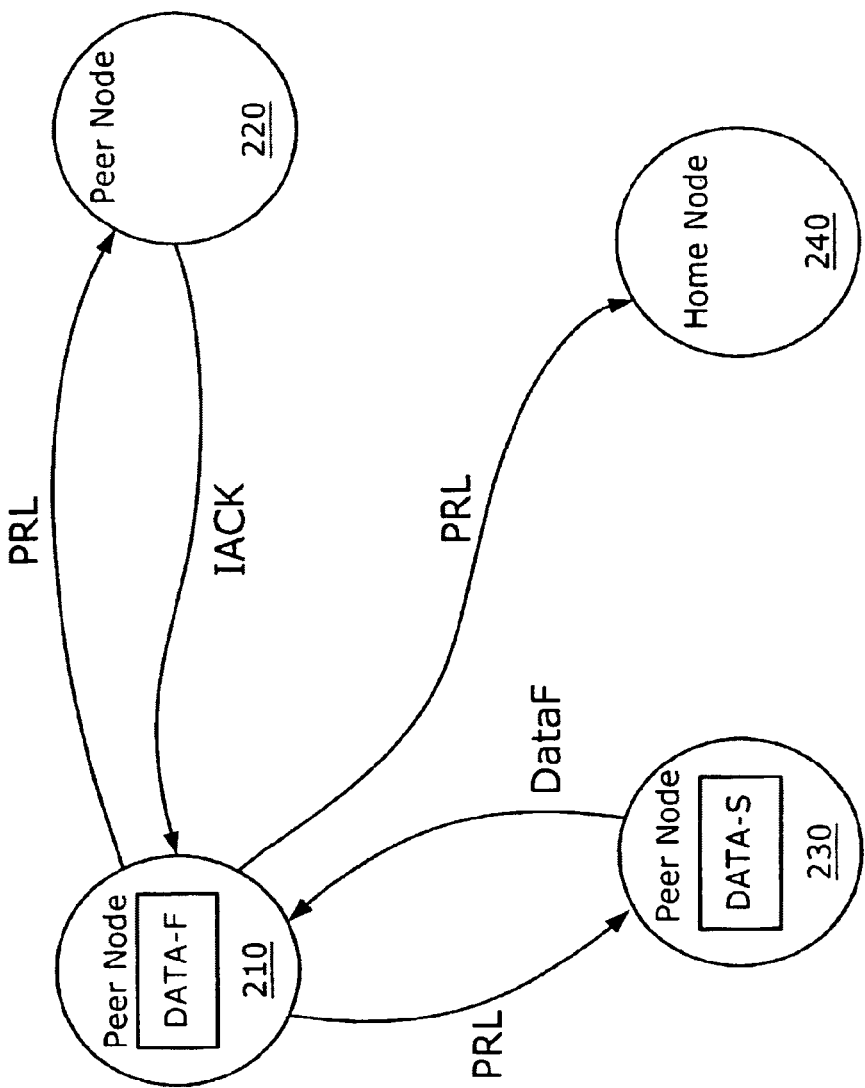
FIGS. 3a through 3c are conceptual illustrations of transfer of data between peer nodes using the Forward state.
Figure 3B:
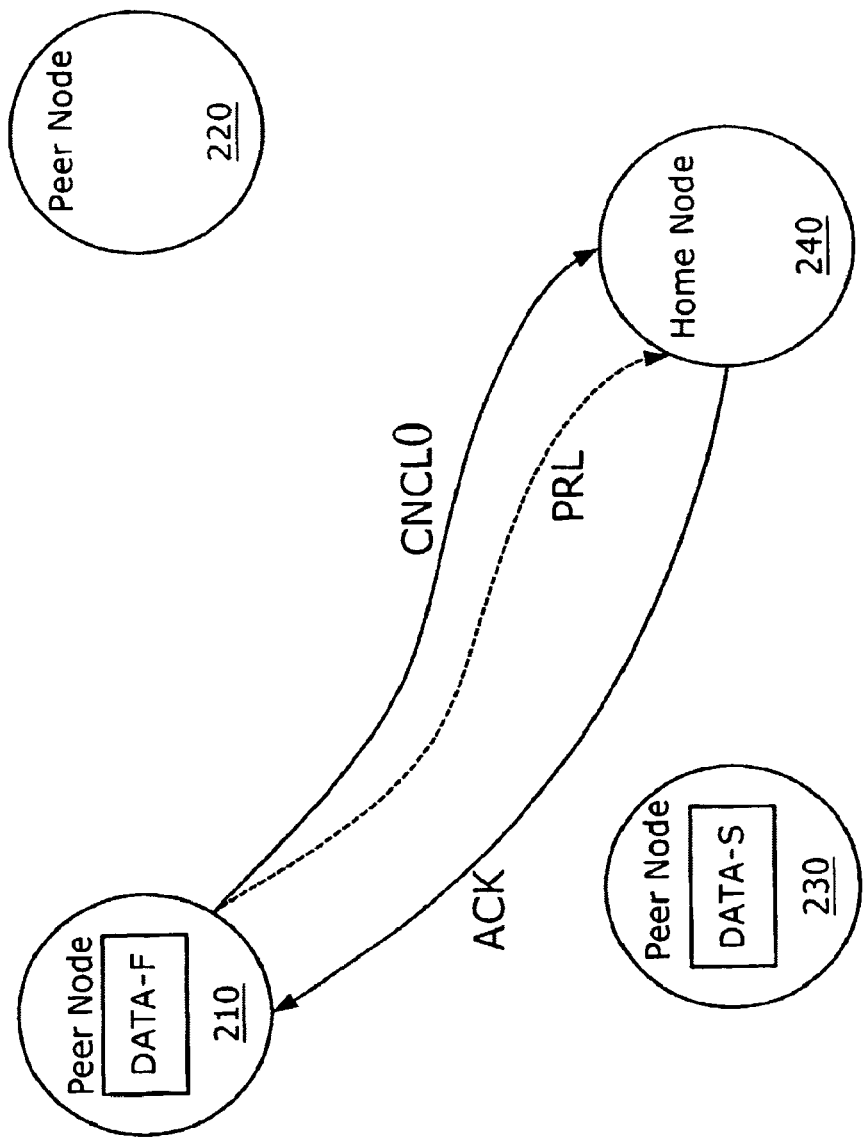
Figure 3C:
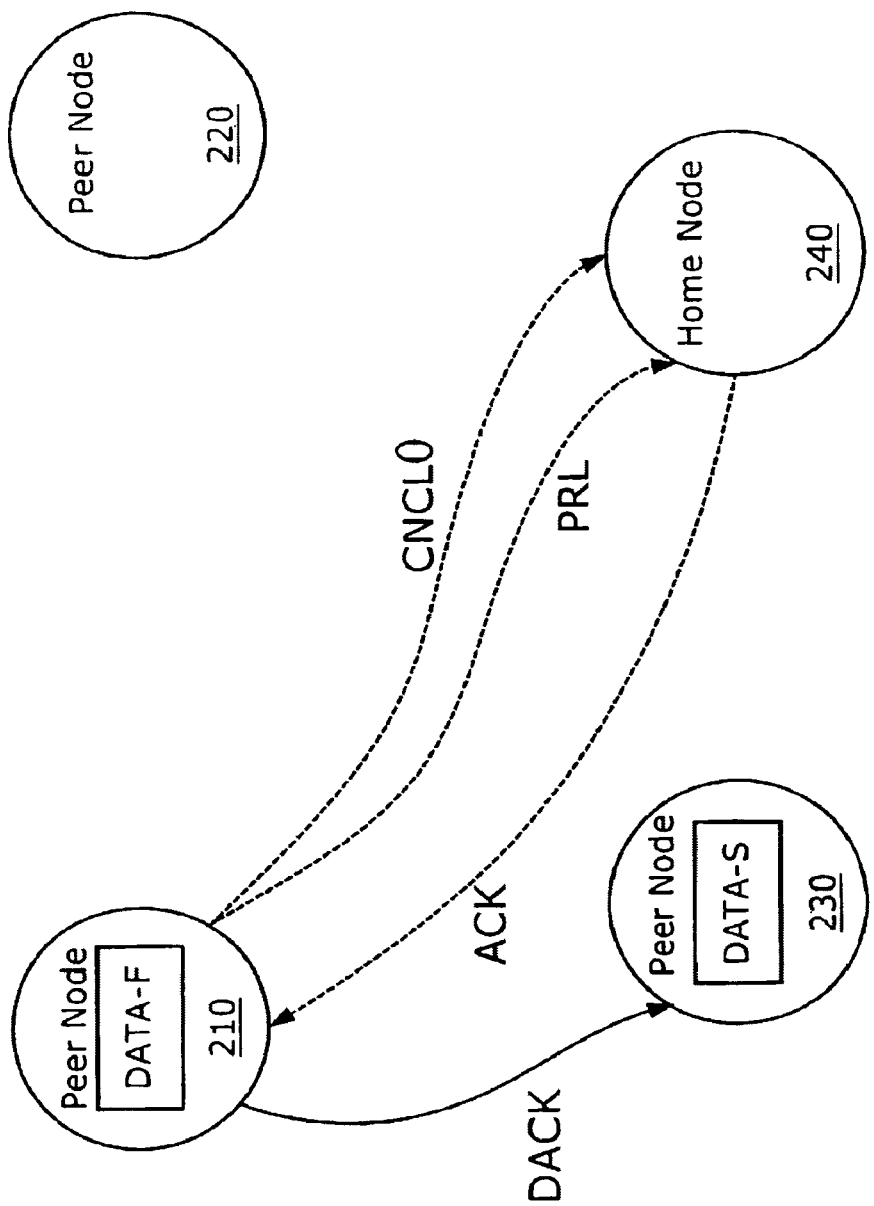

FIGS. 3a through 3c are conceptual illustrations of transfer of data between peer nodes using the Forward state. FIG. 3a illustrates peer node 210 requesting the data previously requested and currently stored in peer node 230 in F state (for example, as illustrated above in FIGS. 2a and 2b). To request the data, peer node 210 broadcasts a PRL message (peer node 210 can also transmit the PRL message to a subset of nodes) to the other nodes of the system. Peer node 220 responds with an IACK message indicating that peer node 220 does not have a valid copy of the requested data. Peer node 230 responds with a DataF message to provide a copy of the data to peer node 210 and to indicate to peer node 210 that the data should be stored in the F state. In another embodiment, the copy of the requested data stored by peer node 230 is placed in the S state.

FIG. 3b illustrates messages from peer node 210 in response to receiving a copy of the requested data from peer node 230. Peer node 210 upon receiving all responses from peer nodes 220 and 230, sends a CNCL( ) message to home node 240, which causes home node 240 to halt fetching operations started in response to the PRL message from peer node 210 and indicates that no known conflicts exist with respect to the PRL message. The home node 240 then sends an ACK message to node 210.

FIG. 3c illustrates a final message from home node 240 concluding the transfer of data from peer node 230 to peer node 220. In one embodiment, peer node 210, once it receives the ACK message, sends a DACK message to peer node 230 indicating that peer node 210 has received the requested data from peer node 230. In an alternate embodiment, home node 240 can send the DACK message to peer node 230 rather than letting peer node 210 send the DACK message to node 230. In the alternate embodiment, the CNCL( ) message from peer node 210 contains information indicating that peer node 210 received data from peer node 230 so that home node 240 can track which peer node should receive the DACK message.

While the example of FIGS. 2a and 2b and FIGS. 3a through 3c are described with respect to a four node system, the techniques described herein are applicable to a multi-node system of any size. The nodes of FIGS. 2a and 2b and FIGS. 3a through 3c are intended to represent any type of component that can store data and request copies of data. For example, a node can be a cache memory in a multiprocessor computer system, or a node can be a computer system in a network, or a node can be a group of one or more processors and/or cache memories within a more complex system.

One Embodiment of Process Flow

Figure 4:
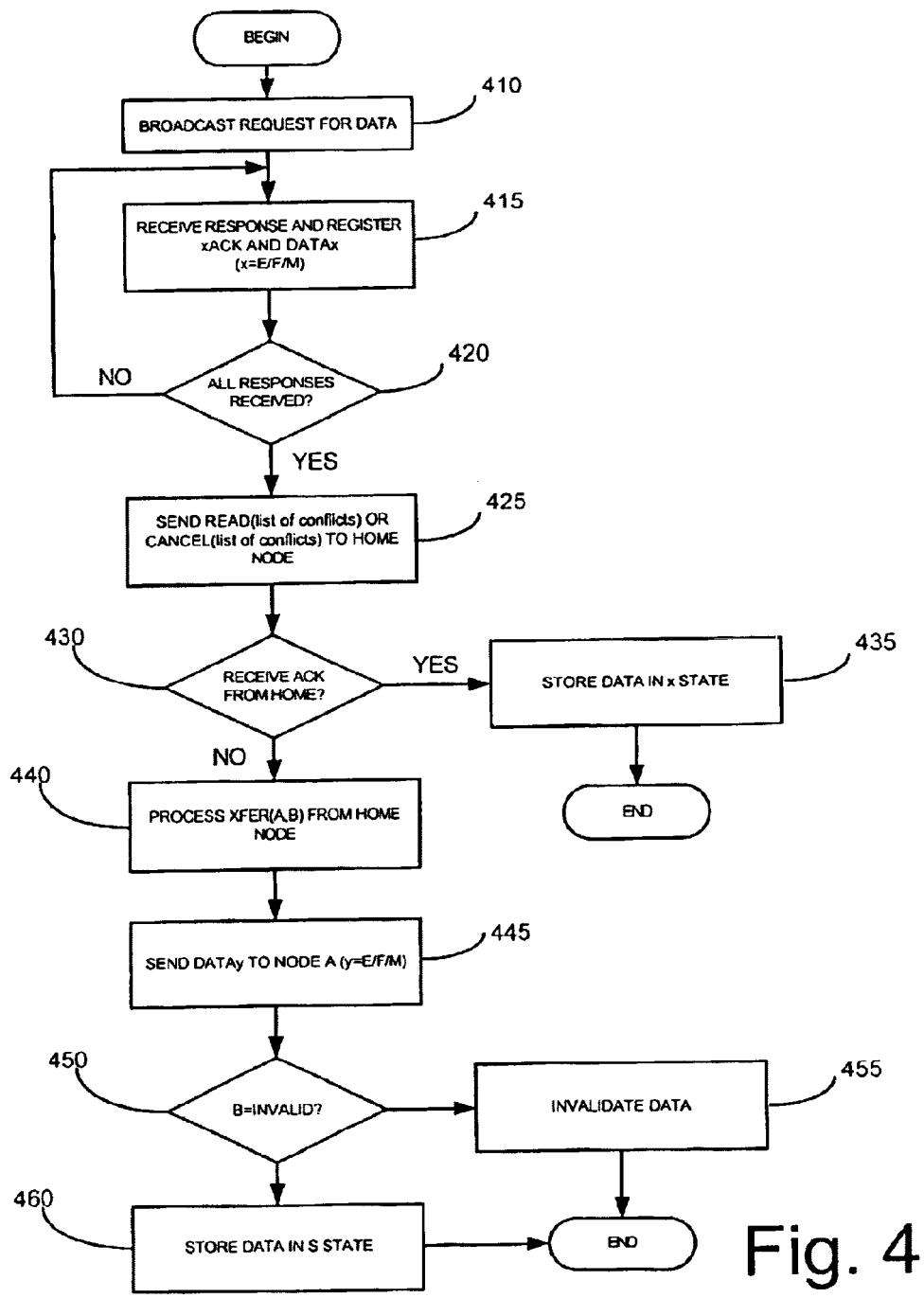
FIG. 4 is a flow diagram corresponding to one embodiment of a technique for providing copies of data using a Forward state.

FIG. 4 is a flow diagram corresponding to one embodiment of a technique for providing copies of data using a Forward state. In one embodiment, when a node requests data, the requesting node broadcasts a request for the data (e.g., a PRIL message) to all other nodes of a system, 410. In alternate embodiments, the request can be transmitted to a subset of nodes within the system, or transmitted to other nodes via a network connection.

Response messages are received from other nodes in the system, 415. As discussed above, the response messages can take several forms. The requesting node will receive one or more xACK (e.g., IACK, SACK) messages from nodes in the system that do not have a valid copy of the requested data. The requesting node will also receive a DATAx (e.g., DataF, DataM) message from either the home node or from a peer node that has a copy of the requested data in the F state.

If all responses have been received, 420, the requesting node sends a READ message or a CANCEL message with a list of conflicts identified to the home node, 425. If an ACK message is received from the home node, 430, the data is stored in the state indicated by the DATA message. If a XFER message is received from the home node rather than an ACK message, 440, the requesting node processes the XFER message from the home node.

In response to the XFER message, the requesting node sends a DATA message to the node indicated by the XFER message, 445. If the XFER message indicates the data should be invalidated, 450, the requesting node invalidates the copy of the data retained, 455. If the XFER message does not cause the requesting node to invalidate the copy of the data, 450, the requesting node stores the data in the S state, 460.

Example Embodiment of a Node

Figure 5:
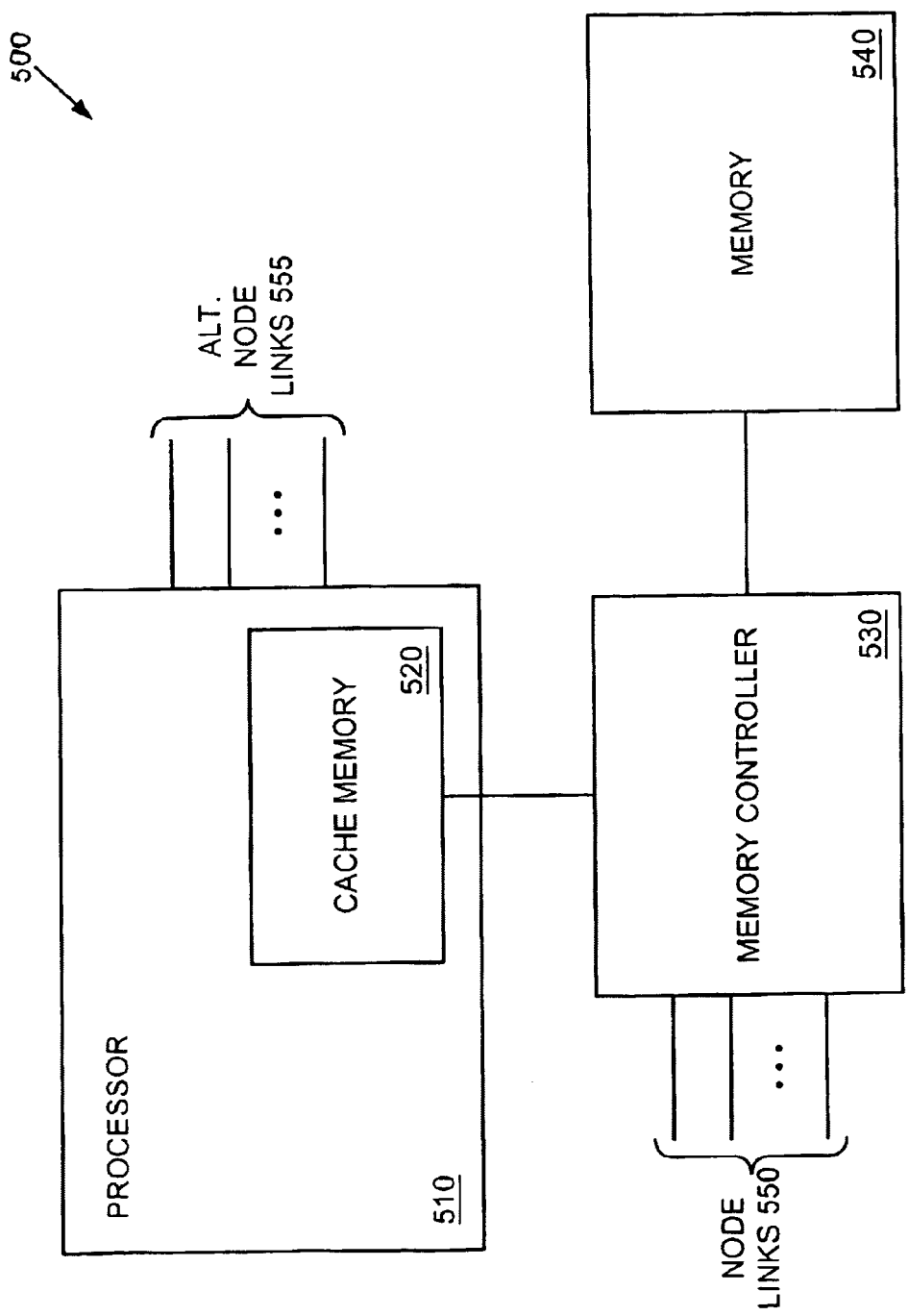
FIG. 5 is a block diagram of one embodiment of a node.

FIG. 5 is a block diagram of one embodiment of a node. Node 500 is illustrated with a single processor, cache memory, memory controller and memory; however, any number of any of components can be included in a node. Further, additional and/or different components (e.g., a bus bridge) can also be included in a node.

Processor 510 can be any type of processor known in the art. In one embodiment, processor 510 includes cache memory 520. In alternate embodiments, cache memory 520 is external to processor 510, and/or additional cache memories can be included that are internal or external to processor 510.

Memory controller 530 is coupled with cache memory 520 and memory 540. Memory controller 530 operates as an interface between processor 510, cache memory 520 and memory 540. In one embodiment, memory controller 530 maintains cache coherency according to the cache coherency protocol described herein. Memory controller 530 interacts with other nodes via node links 550. In an alternate embodiment, processor 510 interacts with memory controller 530 to maintain cache coherency as described herein and processor 510 interacts with other nodes via alternative node links 555.

Example Embodiment of a Multiprocessor System

Figure 6:
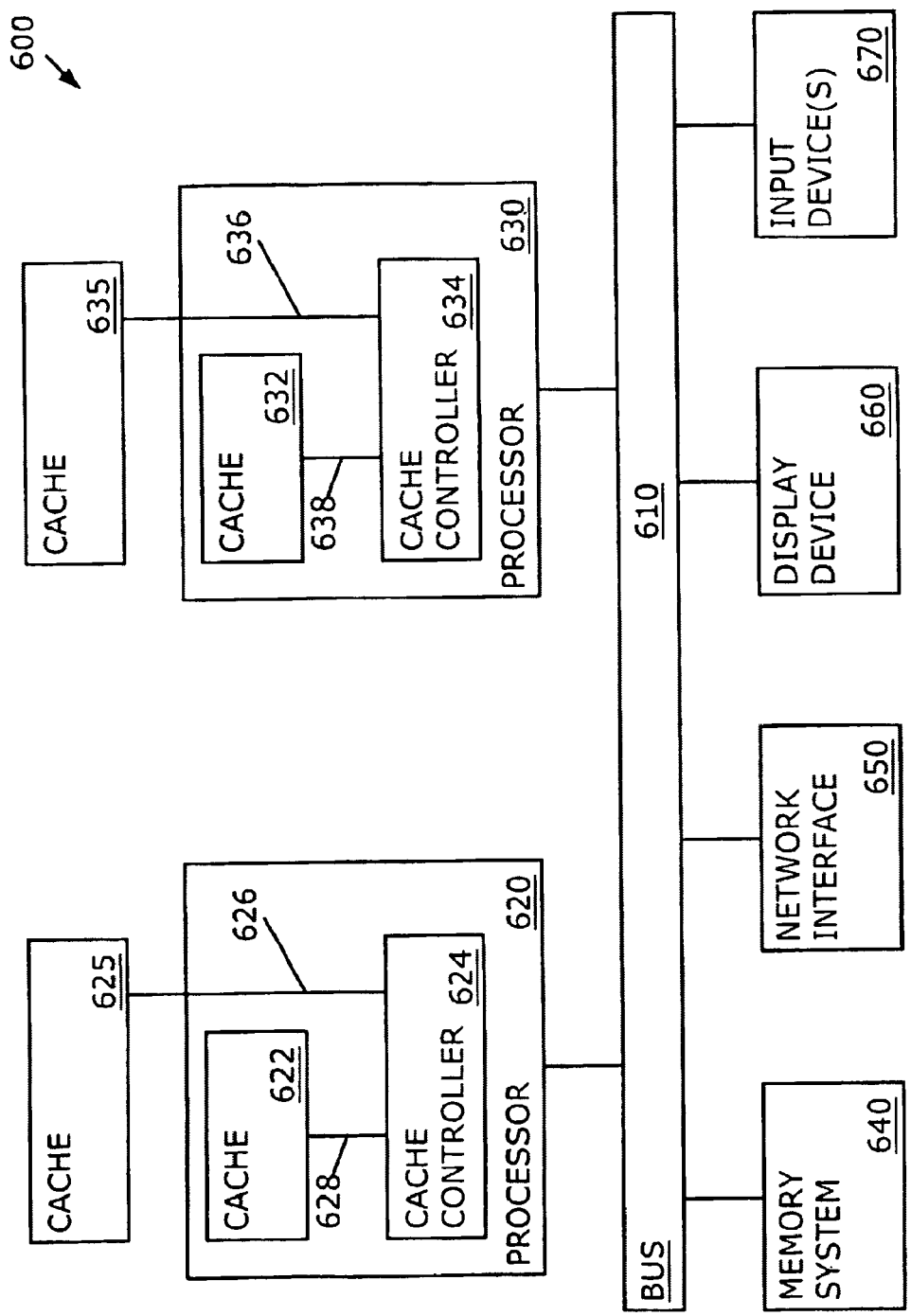
FIG. 6 is one embodiment of a multiprocessor system.

FIG. 6 is one embodiment of a multiprocessor system. Multiprocessor system 600 is intended to represent a range of systems having multiple processors, for example, computer systems, real-time monitoring systems, etc. Alternative multiprocessor systems can include more, fewer and/or different components. In certain situations, the cache management techniques described herein can be applied to both single processor and to multiprocessor systems. Multiprocessor system 600 can be configured to operate as a multi-node system.

Multiprocessor system 600 includes bus system 610 or other communication device(s) to communicate information. Bus system 610 can include any number of buses and associated interconnection circuitry, for example, bus bridges. Processor 620 is coupled with bus system 610 to process information. Processor 620 can include cache memory 622, for example a level zero (L0) cache memory, and cache controller 624. In one embodiment, processor 620 is also coupled with cache 625, which can be any type of cache memory. In an alternate embodiment, cache 625 can be coupled with bus system 610. Other types of processor-cache configurations can also be used.

In one embodiment, cache controller 624 is coupled with cache memory 622 via cache memory interface 628, which can be, for example, a bus internal to processor 620. Cache controller is coupled with cache memory 625 via cache interface 626, which provides an interface between processor 620 and an external cache memory.

Multiprocessor system 600 further includes processor 630 with cache memory 632 and cache controller 634. Cache controller 634 is coupled with cache memory 632 via cache interface 638. Similarly, cache controller 634 is coupled with cache memory 635 via cache interface 636. In one embodiment, cache memory 635 is coupled with processor 630.

While multiprocessor system 600 is illustrated with two processors, multiprocessor system 600 can include any number of processors and/or co-processors. Multiprocessor system 600 further includes memory system 640 coupled with bus system 610. Memory system 640 can include any combination of dynamic (e.g., random access memory) and static (e.g., read-only memory, CD-ROM, disk storage, flash memory) memory devices and associated drives, where appropriate. The memory devices of memory system 640 are used to store information and instructions to be executed by processors of multiprocessor system 600. Memory system 640 also can be used to store temporary variables or other intermediate information during execution of instructions by the processors.

Instructions can be provided to memory system 640 from a static or remote storage device, such as magnetic disk, a read-only memory (ROM) integrated circuit, CD-ROM, DVD, via a remote connection that is either wired or wireless, etc. In alternative embodiments, hard-wired circuitry can be used in place of or in combination with software instructions. Thus, execution of sequences of instructions is not limited to any specific combination of hardware circuitry and software instructions.

Multiprocessor system 600 further includes network interface 650 to provide access to a network, such as a local area network and/or the Internet. Network interface 650 can provide wireless and/or wired network interfaces, which can include communication of instructions to and/or from remote electronically-accessible media. An electronically-accessible medium includes any mechanism that provides (i.e., stores and/or transmits) content (e.g., computer executable instructions) in a form readable by an electronic device (e.g., a computer, a personal digital assistant, a cellular telephone).

For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals).

Multiprocessor system 600 can also include display device 660, such as a cathode ray tube (CRT) or liquid crystal display (LCD), to display information. Input device (s) 670, including, for example, a keyboard having alphanumeric and other keys, is typically coupled to bus 610 to communicate information and command selections to processors 620 and/or 630. Another type of user input device is a cursor control device, such as a mouse, a trackball, or cursor direction keys to communicate direction information and command selections to processors 620 and 630 and to control cursor movement on display device 660.

Conclusion

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense. The F state can be used in a bus-based multiprocessor system.

What is claimed is:

1. A method comprising:
   storing a block of data in one or more cache memories in a system having multiple cache memories;
   designating a single cached copy of the block of data as a copy to be used to respond to a broadcast request for a copy of the block of data; and
   responding to the broadcast request for the block of data by providing a copy of the block of data with the cache memory storing the designated copy of the block of data.

2. The method of claim 1 wherein the request is broadcast asynchronously with respect to cache operations in the receiving cache memories.

3. The method of claim 1 further comprising storing the copy of the block of data provided as a response with a requesting cache memory, wherein the copy of the block of data stored by the requesting cache memory is designated as a single cache copy to be used to respond to future requests for a copy of the block of data.

4. The method of claim 1 wherein the block of data comprises a cache line.

5. The method of claim 1 wherein responding to a request for the block of data by providing a copy of the block of data with the cache memory storing the designated copy of the block of data comprises:
   receiving a request for the block of data;
   determining whether a copy of the block of data is stored in a local cache memory;
   if a copy of the block of data is stored in the local cache memory, determining whether the stored block of data is the designated copy of the block of data; and
   transmitting a copy of the block of data to a requesting cache memory if the stored block of data is the designated copy of the block of data.

6. A method comprising:
   transmitting a request for a copy of a data segment from a requesting node to one or more nodes of a multi-node system, wherein one of the nodes receiving the request is a home node that stores the data segment in a non-cache memory and the non-home nodes are peer nodes to the requesting node that store a copy, if any, in cache memories associated with the respective peer nodes;

providing a copy of the data segment from the home node if none of the peer nodes stores a sharable copy of the data segment; and providing a copy of the data segment from the peer node storing a copy of the data segment in a forward state, wherein only one of multiple copies of the data segment stored by multiple peer nodes is designated in the forward state.

7. The method of claim 6 further comprising providing a copy of the data segment from a designated peer node having a copy of the data segment, if the designated peer node is the only peer node to store a copy of the data segment.

8. The method of claim 6 further comprising:
designating the copy of the data segment provided to the requesting node as being in the forward state; and
designating the copy of the data segment from the peer node in the forward state as being in a shared state in response to the request for the data segment from the requesting node.

9. The method of claim 6 wherein transmitting the request for a copy of the data segment from the requesting node to one or more nodes of the multi-node system comprises broadcasting the request to all non-requesting nodes of the multi-node system.

10. The method of claim 6 wherein transmitting the request for a copy of the data segment from the requesting node to one or more nodes of the multi-node system comprises transmitting the request to a subset of all non-requesting nodes of the multi-node system.

11. The method of claim 6 wherein the data segment comprises a cache line.

12. The method of claim 6 wherein the data segment comprises a block of data that is smaller than a cache line.

13. The method of claim 6 wherein the data segment comprises a block of data that is greater than a cache line.

14. A system comprising:
a home node coupled with a memory system to store an original copy of a data segment; and
a plurality of peer nodes coupled with the home node via a bus system, the plurality of peer nodes having cache memories, wherein, in response to a request by a requesting peer node that requests a copy of the data segment, a non-requesting peer node provides a copy of the data segment, if the non-requesting peer node has a copy of the data segment in a forward state and the home node provides a copy of the data segment if no non-requesting peer node has a copy of the data segment in the forward state, and further wherein only one of one or more cached copies of the data segment are in the forward state prior to the request.

15. The system of claim 14 wherein the data segment comprises a cache line.

16. The system of claim 14 wherein the data segment comprises a block of data that is smaller than a cache line.

17. The system of claim 14 wherein the data segment comprises a block of data that is greater than a cache line.

18. The system of claim 14 wherein the requesting peer node broadcasts the request for the data segment to the home node and to each of the non-requesting peer nodes.

19. The system of claim 14 wherein the requesting peer node transmits the request for the data segment to a subset of the home node and each of the non-requesting peer nodes.

20. An apparatus comprising:
a cache memory controller;
a cache memory interface coupled with the cache memory controller, the cache memory interface to allow the cache memory controller to interact with a cache memory; and
a system interface coupled with the cache memory controller, the system interface to allow the cache memory controller to interact with other components of a system;
wherein the cache memory controller transmits, via the system interface, a request for a data segment when the data segment is to be used and a valid copy of the data segment is not stored in the cache memory and further wherein when a copy of the requested data segment is received, the cache memory controller causes the copy of the requested data to be stored in the cache memory and designated in a forward state, and further wherein, when a request for a copy of the data segment is received via the system interface, the cache memory controller causes a copy of the data segment to be transmitted if the stored copy is in the forward state.

21. The apparatus of claim 20 wherein the data segment comprises a cache line.

22. The apparatus of claim 20 wherein the cache memory controller causes the request for the data segment to be broadcast to each node of a multi-node system.

23. The apparatus of claim 20 wherein the cache memory controller causes the request for the data segment to be broadcast to a subset of nodes of a multi-node system.

24. The apparatus of claim 20 further comprising a memory interface coupled with the cache memory controller to allow interaction between the cache memory controller and an external memory, wherein in response to a request for a copy of a data segment for which the external memory is designated a home node, the cache memory controller causes the data segment to be retrieved from the external memory and transmitted, via the network interface, to a requesting node.

25. An article comprising a machine-accessible medium to provide machine-readable instructions that, when executed, cause one or more electronic systems to:
store a block of data in one or more cache memories in a system having multiple cache memories;
designate a single cached copy of the block of data as a copy to be used to respond to requests for copies of the block of data; and
respond to a request for the block of data by providing a copy of the block of data with the cache memory storing the designated copy of the block of data.

26. The article of claim 25 further comprising instructions that, when executed, cause the one or more electronic systems to store the copy of the block of data provided as a response with a requesting cache memory, wherein the copy of the block of data stored by the requesting cache memory is designated as a single cache copy to be used to respond to future requests for a copy of the block of data.

27. The article of claim 25 wherein the block of data comprises a cache line.

28. The article of claim 25 wherein the instructions that cause the one or more electronic systems to respond to a request for the block of data by providing a copy of the block of data with the cache memory storing the designated copy of the block of data comprises instructions that, when executed, cause the one or more electronic systems to:
receive a request for the block of data;
determine whether a copy of the block of data is stored in a local cache memory;
if a copy of the block of data is stored in the local cache memory, determine whether the stored block of data is the designated copy of the block of data; and
transmit a copy of the block of data to a requesting cache memory if the stored block of data is the designated copy of the block of data.

29. An article comprising a machine-accessible medium to provide machine-readable instructions that, when executed, cause one or more electronic systems to:

transmit a request for a copy of a data segment from a requesting node to one or more nodes of a multi-node system, wherein one of the nodes receiving the request is a home node that stores the data segment in a non-cache memory and the non-home nodes are peer nodes to the requesting node that store a copy, if any, in cache memories associated with the respective peer nodes;

provide a copy of the data segment from the home node if none of the peer nodes stores a sharable copy of the data segment; and provide a copy of the data segment from the peer node storing a copy of the data segment in a forward state, wherein only one of multiple copies of the data segment stored by multiple peer nodes is designated in the forward state.

30. The article of claim 29 further comprising instructions that, when executed, cause the one or more electronic systems to provide a copy of the data segment from a designated peer node having a copy of the data segment, if the designated peer node is the only peer node to store a copy of the data segment.

31. The article of claim 29 further comprising instructions that, when executed, cause the one or more electronic systems to:

designate the copy of the data segment provided to the requesting node as being in the forward state; and designate the copy of the data segment from the peer node in the forward state as being in a shared state in response to the request for the data segment from the requesting node.

32. The article of claim 29 wherein the instructions that cause the one or more electronic systems to transmit the request for a copy of the data segment from the requesting node to one or more nodes of the multi-node system comprises instructions that, when executed, cause the one or more electronic systems to broadcast the request to all non-requesting nodes of the multi-node system.

33. The article of claim 29 wherein the instructions that cause the one or more electronic systems to transmit the request for a copy of the data segment from the requesting node to one or more nodes of the multi-node system comprises instructions that, when executed, cause the one or more electronic systems to transmit the request to a subset of all non-requesting nodes of the multi-node system.

34. The article of claim 29 wherein the data segment comprises a cache line.

\* \* \* \* \*